United States Patent [19]

Hutter, III

[11] 4,302,492
[45] Nov. 24, 1981

[54] ADHESIVE ATTACHMENT

[75] Inventor: Charles G. Hutter, III, North Hollywood, Calif.

[73] Assignee: Physical Systems, North Hollywood, Calif.

[21] Appl. No.: 74,932

[22] Filed: Sep. 13, 1979

[51] Int. Cl.³ .......................... B32B 1/00; B32B 7/06
[52] U.S. Cl. ........................................ 428/40; 156/71;
156/234; 156/247; 156/344; 248/205 A;
428/64; 428/65; 428/99; 428/174; 428/343
[58] Field of Search ................... 24/73 VA, DIG. 11;
40/20 R; 156/71, 344, 247, 234, 254; 248/205
A, 206 R, 363, 467; 428/99, 157, 174, 343, 158,
40, 42, 64, 65, 66

[56] References Cited

U.S. PATENT DOCUMENTS 2,557,434  6/1951  Hoverder ...................... 248/205 A
3,885,768  5/1975  Frye ................................... 248/467

Primary Examiner—Robert A. Dawson
Attorney, Agent, or Firm—Fulwider, Patton, Rieber, Lee & Utecht

[57] ABSTRACT

A method and apparatus making use of that method for applying pressure to an element to be adhesively or comparably secured to a supporting member. An example of such an apparatus is found in a patch and means for applying it to a surface which may have been ruptured.

22 Claims, 16 Drawing Figures

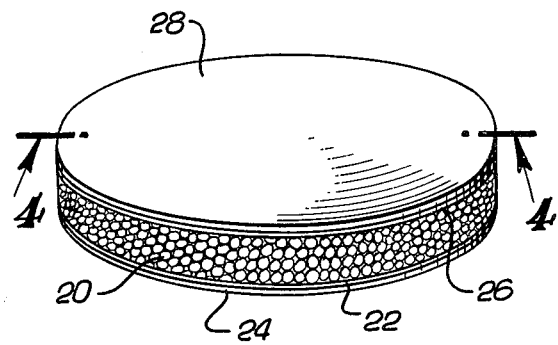
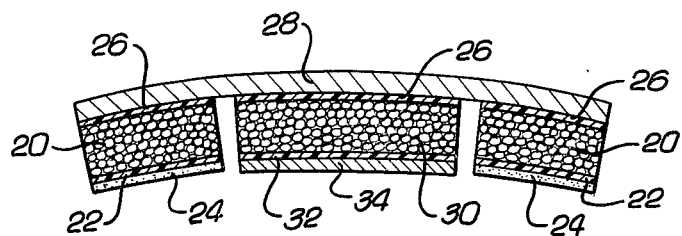
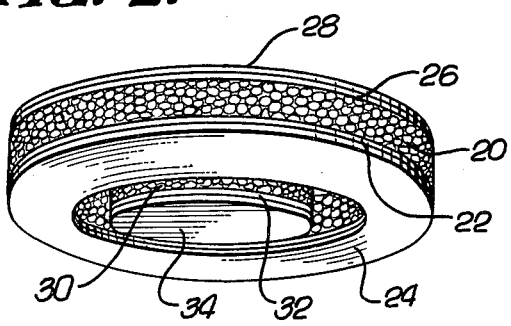
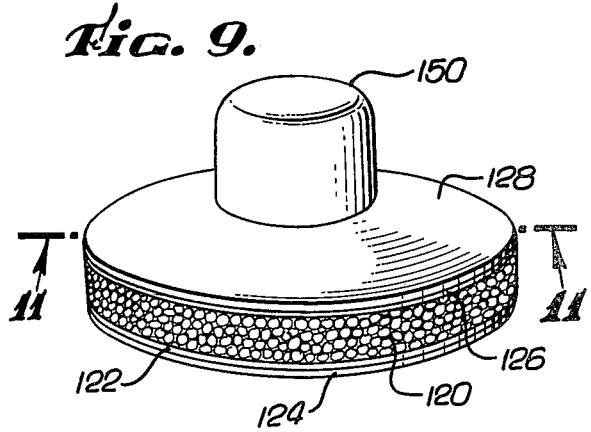
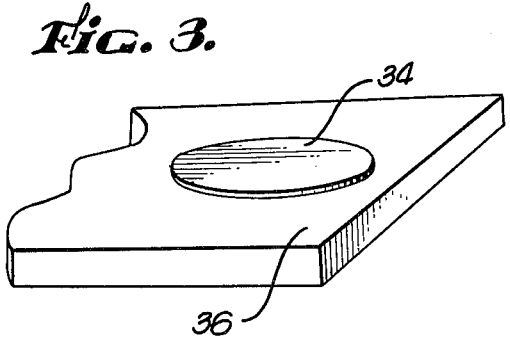
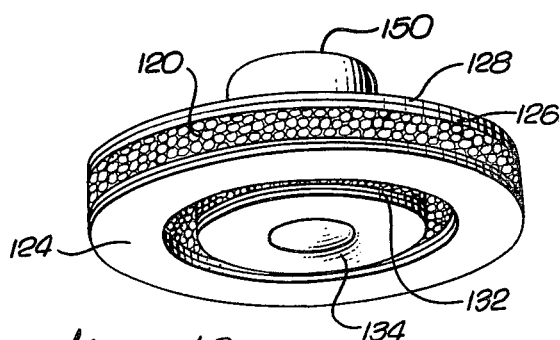

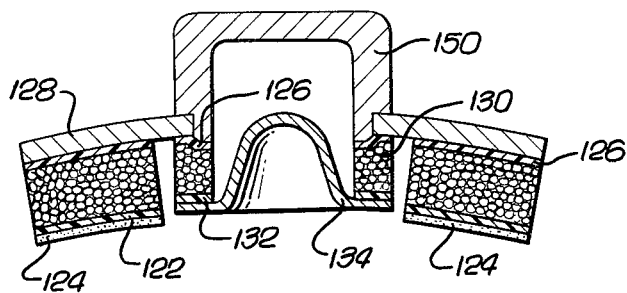
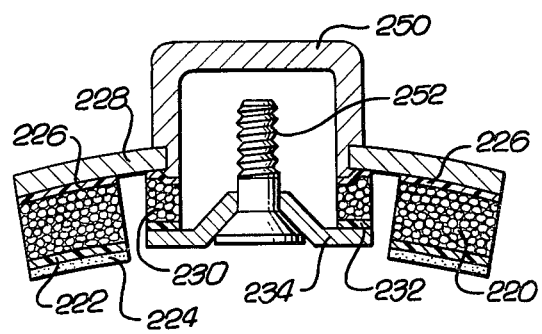
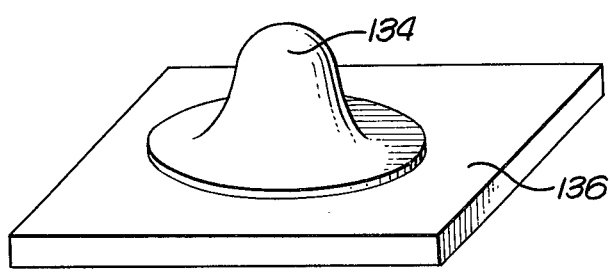
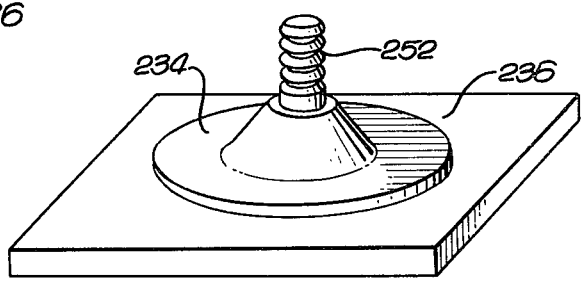
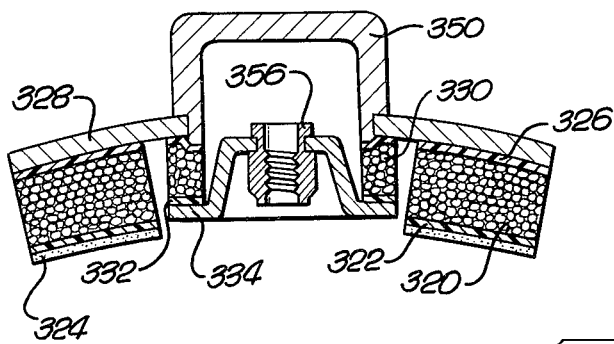
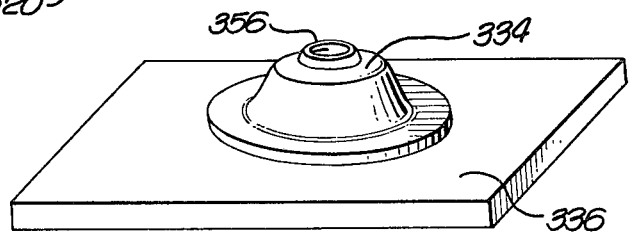

4,302,492

ADHESIVE ATTACHMENT

BACKGROUND OF THE INVENTION

In many fields, it is important to be able to apply an element such as a patch or a holding means such as a stud, a machine nut, or machine screw, or just a flat plate. Thus, it is often important to be able to repair or cover a hole in the skin of an airplane, to patch or cover a hole in a vessel where it is not practical to gain access to the interior of the vessel, where a device must be attached to a supporting member without making a hole through the supporting member as where a rear view mirror is to be attached to a glass windshield, etc, In many of these instances, it is possible to make the attachment by means of an adhesive but in other instances it is necessary or desirable to use another form of bonding such as by soldering, brazing, or welding. In all of the applications concerned herein, it is necessary that the element to be attached be located with reasonable precision and held in the desired location while the bonding is being effected and in most cases with pressure being applied to the element being attached, forcing it against the supporting surface.

Heretofore, it has usually been considered necessary to provide clamps or other means to hold the device to be bonded in position. Such clamps or holding means, sometimes referred to as fixtures, are not convenient to use in many instances, and the need has long existed for some method and appropriate corresponding equipment to bond an element to a surface.

SUMMARY OF THE INVENTION

The present invention includes an element or attachment to be bonded or attached to a surface; resilient means capable of transmitting pressure to urge the attachment against the surface; spring means adapted to apply pressure against the attachment; and resilient means acting to hold the spring means to the supporting surface. In a simple form of the invention, a resilient ring is temporarily adhered to the supporting surface. The opposite side of the resilient ring holds a dished or warped metal plate whose convex surface is away from the resilient ring. The opposite or concave surface of the disk carries a centrally located resilient pad to which in turn is adhesively secured the attachment. A suitable adhesive is applied to the free surface of the attachment, and the resilient ring is adhesively secured to the support. The convex disk member is then pressed towards the support so that the attachment is pressed against the support and the disk is changed to a concave condition so that it continues to exert a force on the attachment. After a suitable time, the temporary bond between the ring and the support is broken and the ring, the disk and the compressible pad are removed leaving the attachment firmly secured to the support.

DESCRIPTION OF FIGURES

FIG. 1 is a top perspective view of the complete attachment assembly;

FIG. 2 is a bottom perspective view of the attachment assembly;

FIG. 3 is a perspective view showing the attachment held to the support;

FIG. 4 is a cross-sectional view of the attachment device taken on the line 4—4 of FIG. 1;

FIG. 9 is a top perspective view of an assembly for an attachment that may be considered to have a hat shape;

FIG. 10 is a bottom perspective view of the assembly shown in FIG. 9;

FIG. 11 is a cross-sectional view taken on the line 11—11 of FIG. 9 and showing the hat-shaped attachment;

FIG. 12 is a perspective view of the hat-shaped attachment after it is applied to the support;

FIG. 13 is a cross-sectional view generally similar to FIG. 11 but showing an attachment having a machine screw projecting therefrom;

FIG. 14 is a perspective view showing the attachment indicated in FIG. 13;

FIG. 15 is a cross-sectional view similar to FIG. 11 but showing an attachment with a machine nut therein; and FIG. 16 is a perspective view showing the attachment shown in FIG. 15.

DESCRIPTION OF PREFERRED FORM

Figure 5:
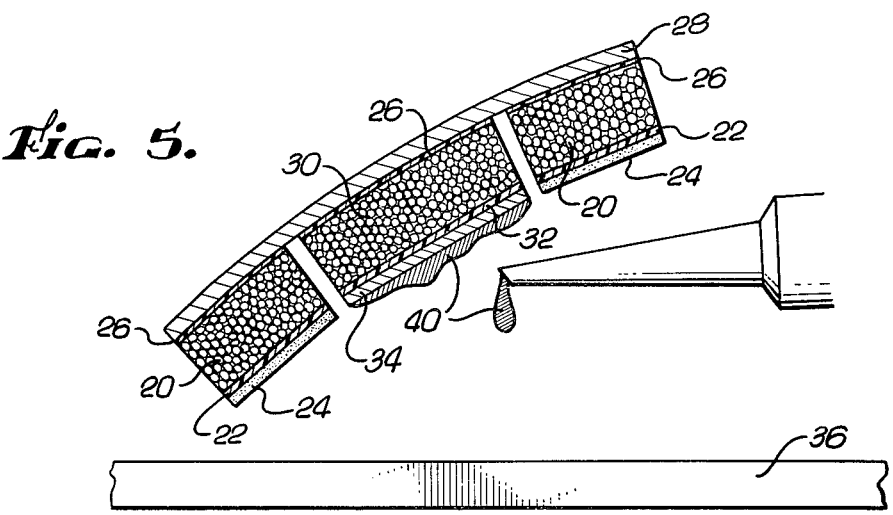
FIG. 5 is a cross-sectional view similar to FIG. 4 showing the application of the bonding material to the attachment.

Turning now to the figures and particularly FIGS. 1 through 4, the present invention comprises broadly a temporary connector means here shown as a resilient ring 20 carrying a pressure-sensitive adhesive layer 22 on its lower surface which in turn is protected by a removable film 24. The opposite or upper surface of the ring 20 is permanently attached by any suitable means such as an adhesive 26 to a spring member 28.

The spring member 28 can take various forms but one of the simplest is formed of a sheet of resilient metal of substantially the same size and shape as the included area of the ring 20 so that in the device shown, the circular ring 20 is attached to the circular disk 28.

Centrally located with respect to the ring 20 and spaced therefrom is a resilient pad 30 that is secured by adhesive 26 to the same surface of the disk 28 that the ring 20 is. For convenience, this surface and direction will hereinafter be referred to as the lower surface or downward direction as indicated in FIG. 4. However, it is to be clearly understood that this direction is solely for convenience and it is the position of the various elements relative to each other that is important rather than whether the surfaces and forces are upward or downward.

The lower surface of the central pad 30 is coated with a temporary pressure-sensitive adhesive 32 to which is adhered an attachment or patch 34 that is to be bonded to a support 36.

Figure 6:
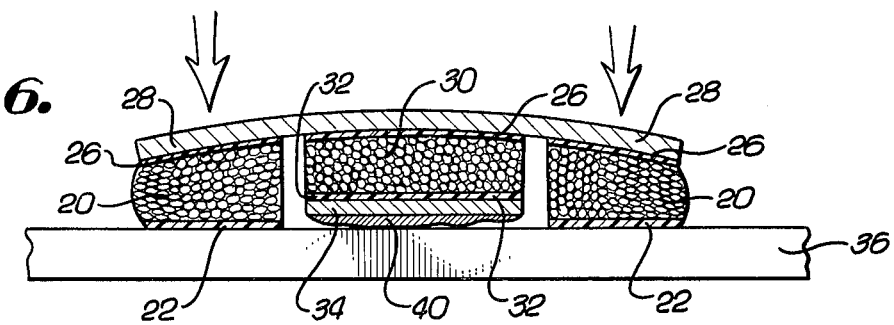
FIG. 6 is a view similar to FIG. 5 showing the positioning and application of the attachment to the support.

Assuming that the patch 34 is to be applied to the support 36, the method of using the device just disclosed is illustrated in FIGS. 5 through 8. After appropriately cleaning the upper surface of the support 36 and the lower surface of the patch, an adhesive 40 is applied to the lower surface of the patch 34 as indicated in FIG. 5 and the protective film 24 is removed from the lower surface of the ring-shaped resilient member 20, uncovering the pressure-sensitive adhesive 22. The patch 34 is then properly located over the appropriate section of the support 36 and pressure is then applied to the edges of the disk 28 as indicated in FIG. 6. This compresses the ring-shaped resilient member 20 and causes the pressure-sensitive adhesive 22 to hold the ring-shaped member 20 to the support 36. At this time there is preferably no contact between the patch 34 or the adhesive 40 thereon and the adjacent surface of the support 36.

Figure 7:
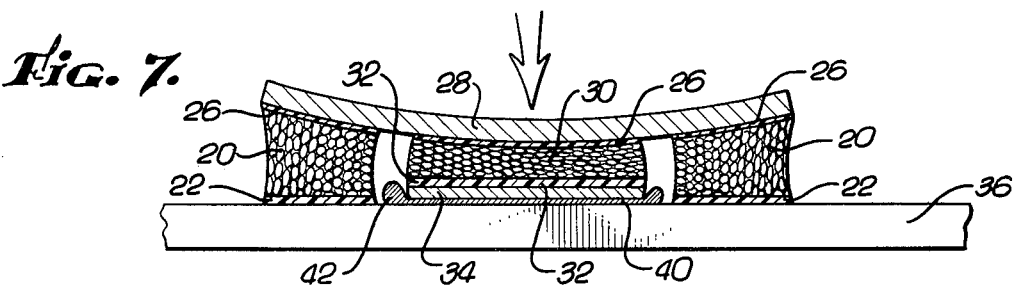
FIG. 7 is a cross-sectional view similar to FIG. 5 showing the application of force to the spring disk and its consequent deformation to apply pressure to the attachment.

To adhere the patch 34 to the support 36, the center portion of the disk 28 is then pressed inwardly as indicated in FIG. 7. As previously mentioned, the disk 28 is formed of a resilient material that has been warped to have a generally convex shape and when sufficient pressure is applied to the upper surface of the disk, as indicated in FIG. 7, the disk snaps from a convex to a concave shape. Consequently the upper surface of the resilient pad 30 is moved towards the support 36 and as a result, the pad is compressed and forces the patch 34 against the support 36. Any excess adhesive 40 is forced outwardly to form a ring 42 around the patch 34.

Figure 8:
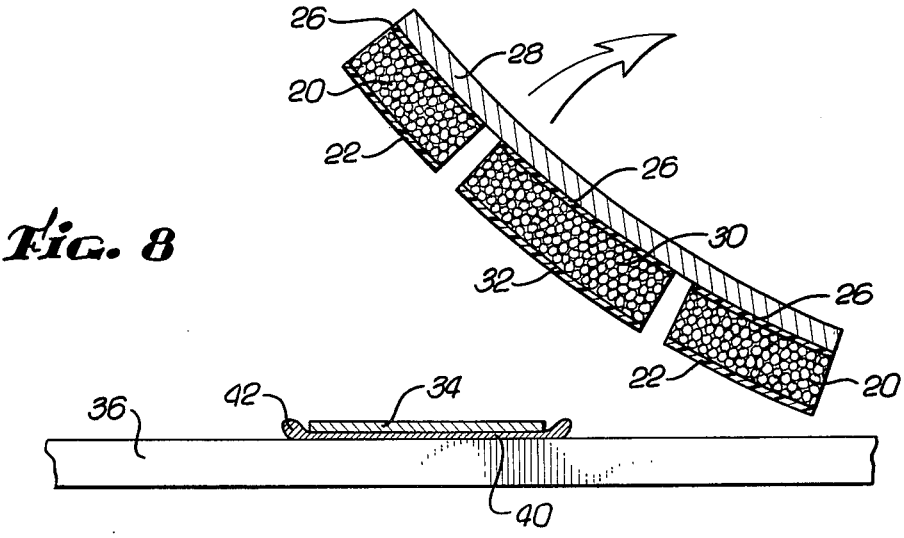
FIG. 8 is a view similar to FIG. 5 showing the removal of the resilient members and spring disk leaving the attachment in place on the support.

At this point the pressure-sensitive adhesive 22 holds the ring 20 to the support 36 and the adhesive 26 holds the disk 28 to the ring-shaped pad 20. The pressure-sensitive adhesive applied to the lower surface of the ring-shaped resilient member 20 must have sufficient strength to hold the resilient member firmly to the support 36 while the adhesive 40 is curing. A study of the forces involved shows that the total force tending to separate the ring 20 and the adhesive 22 from the support 36 equals the total force pressing the patch 34 against the support. After the adhesive 40 has sufficiently cured, additional force is applied to lift the ring-shaped resilient pad 20 from the support 36, the pressure-sensitive adhesive 22 having less adhesive power from the adhesive 40. The pressure-sensitive adhesive 32 releases the patch 34 from the compressible member 30, as indicated in FIG. 8, leaving the patch in place.

It will recognized that the pressure-sensitive adhesive 32 connecting the patch 34 to the compressable pad 30, need have only enough holding powder to hold the patch and the pad together so that the two are conveniently united. On the other hand, the pressure-sensitive adhesive 22 that holds the ring-shaped pad 20 to the support 36, must have greater holding powder since, as indicated in FIG. 7, the pressure applied by spring disk 28 to the patch 34 reacts to provide tension, tending to pull the ring pad 20 from the support 36.

It will also be recognized that it is important that the pressure-sensitive adhesive 32 that holds the patch 34 to the compressible pad 30 must have less holding power than the adhesive 40 holding the patch to the support 36. Were this not so, when the ring pad 20 and spring disk 28 are removed from the support 36, the bond between the compressible pad 30 and the patch 34 would be greater than the bond between the patch and the support 36, and consequently the patch would be removed without having performed its intended function.

OTHER FORMS OF THE INVENTION

In FIGS. 9 through 12, there is illustrated another form of device in which the unit to be applied is what might be termed a hat-member rather than a flat patch. A hat member finds a variety of uses as for example where a protuberance such as a nut is located on a flat surface and a threaded rod extends through that flat surface and into the nut. If a seal is to be provided over the nut and threaded rod, the hat member, best seen in FIG. 12, is useful.

In this form of device the basic construction is similar to that previously described, with a ring-shaped member 120 having a pressure-sensitive adhesive layer 122 on its outer surface carrying a protective film 124. The opposite surface of the ring member 120 is held by an adhesive layer 126 to a spring member 128. In the center of the spring member 128 is a generally dome-shaped member 150 that extends through the spring member and is held thereto by any suitable means. This construction is best seen in FIG. 11.

Centrally located with respect to the ring pad 120 is a compressible pad 130 that is held to the spring member 128 by a suitable adhesive 126. A layer of pressure-sensitive adhesive 132 on the opposite side of the pad 130 holds a hat member 134.

As with the previously described flat patch, the surface of the hat member 134 that is to bonded to a support 136 is coated with an adhesive such as the adhesive 40 previously described and the hat section is installed by properly positioning the assembly and then pressing on the projection 150 so that the spring 128 is forced over-center in the same manner that spring 28 is forced over-center as illustrated in FIG. 7. After the adhesive 40 is properly bonded, the spring 128 and members carried by it are removed in the manner previously described, leaving the hat member 134 on the support 136.

In FIGS. 13 and 14 an attachment 234 and support 236 are shown, comparable to the hat member 134 and the support 136, the attachment 234 having a screw member 252 projecting upwardly from the support member 236 as best seen in FIG. 14. The construction of the assembly is quite similar to that shown in FIG. 11 with a spring member 228 having a ring member 220 cemented to the spring by an adhesive 226 with the ring member having a pressure-sensitive adhesive 222 protected by a removable film 224. A dome section 250 in the central portion of the spring 228 carries a compressible pad 230 having a pressure-sensitive adhesive 232 that carries an attachment 234 having an upwardly projecting screw 252. The construction is indicated in cross-section in FIG. 13 and the method of application is similar to that of the hat member previously described.

In FIGS. 15 and 16 there is shown another attachment generally similar to those previously described but carrying a threaded nut. As illustrated in these Figures, a deformable spring 328, similar to the springs 128 and 228, carries a projection 350 with a ring member 320 attached by means of an adhesive layer 326. A layer of pressure-sensitive adhesive 322 carries a protective film 324 all as previously described. A compressible pad 330 centered with respect to the ring pad 320 carries an attachment member 334 held to the compressible pad by a pressure-sensitive adhesive 332. Centrally located with respect to the attachment 334 is a nut 356 that may be held to the attachment member by any suitable means. The method and means for attachment to a support 336 is comparable to that previously described.

It is to be understood, of course, that the attachment need not take the particular forms herein shown. Thus, if a rectangular patch were to be applied to a support, this can very conveniently be done. Likewise, it is not important that the support be plane since it frequently happens that a patch must be applied to a curved surface which may be curved in one or two meridians. The resilient pad 30 applies sufficient pressure to the patch 34 to cause it to conform to the surface of the support 36.

Additionally, the nature of the adhesive materials is not restricted. The adhesive 40, for example, may be one that gains its strength by evaporation of a solvent; one that gains its strength by chemical reaction as is the case in some of the epoxy adhesives; or an adhesive that gains its strength and produces a bond by melting as some glue-like materials or even solder.

In each case, it is important that the bond be formed between the patch 34 and the support 36 be the strongest of the various bonds to be established. The bond formed between the ring cushion 20 and the support 36 will be the next strongest bond since in pressing the patch 34 against the support 36, the spring 28 places the ring pad 20 in tension, tending to pull it away from the support. It is important that the ring pad 20 not be pulled away from the support 36 by the action of the spring member 28 but it is also important that it be possible to remove the ring member without a great deal of difficulty after the bond between the patch 34 and support has been completed. The bond created by the pressure-sensitive adhesive 32 holding the patch 34 to the compressible pad 30 should be a relatively weak bond since it is important that the pad 30 be removed from the patch 34 without any undue strain tending to remove the patch from the support 36.

It is also to be understood that it is not essential that the spring member 28 take the form of a convex disk that can be pressed by the thumb to assume an over-center concave shape. Depending upon the size of the patch and its nature, it may be necessary to strike the spring member, as with a hammer. While other forms may be used, the over-center disc spring illustrated is one of the simplest forms available.

While a preferred and alternate forms of the invention have been described and illustrated, it is to be understood that the invention is not to be limited to the particular form or arrangement of parts herein described and shown, nor to the precise sequence of operations described, except as limited by the claims.

I claim:

1. Means for applying an attachment to a support which includes:
   an attachment;
   means supporting said attachment;
   connector means adapted for temporary connection of said supporting means with respect to said support; and
   said supporting means being movable while temporarily connected with respect to said support by said connector means between a first position for supporting said attachment in a first position out of bearing engagement with said support and a second position for supporting said attachment in a second position in bearing engagement with said support, said supporting means including spring means operable to apply a force to said attachment to urge said attachment in a direction toward said support when said supporting means is in said second position.

2. Attachment applying means as defined in claim 1 in which said supporting means comprises an over-center type spring plate carrying said attachment and selectively movable between said first position where said attachment is not pressed against said support and said second position where said attachment is resiliently urged against said support, and a resilient pad carried by said spring plate, and wherein said connector means comprises an adhesive layer on said resilient pad for holding said pad temporarily to said support.

3. Means for applying an attachment to a support which includes:
   an attachment;
   a first resilient pad connected to said attachment;
   a second resilient pad around said attachment and having adhesive means for temporary connection to said support; and
   support means overlying said first and second resilient pads and connected to both, said support means having a first position wherein said attachment is withdrawn into said second resilient pad, and is selectively movable into a second position wherein said attachment is resiliently urged outwardly of said second resilient pad toward said support to place said second resilient pad under tension and said first resilient pad under compression whereby said first and second resilient pads cooperate to apply a force to said attachment to urge said attachment toward the support.

4. Attachment applying means as defined in claim 3 in which said first resilient pad is adhesively secured to said attachment but easily removable therefrom.

5. Attachment applying means as defined in claim 3 in which said second resilient pad is spaced from and surrounds said attachment.

6. Attachment applying means as defined in claim 3 in which said support means is a warped plate attached to said first and second resilient pads, and selectively movable from a convex first position to a concave second position.

7. Attachment applying means as defined in claim 1 wherein said supporting means comprises means carrying said attachment and movable between said first and second positions, and a resilient pad connected between said connector means and said attachment carrying means, said pad being placed under tension upon movement of said attachment carrying means to said second position when said pad is temporarily connected with respect to the support, whereby said pad under tension applies a force to said attachment carrying means and said attachment to urge said attachment in a direction toward the support.

8. Attachment applying means as defined in claim 7 wherein said resilient pad comprises an annular pad spaced radially outwardly from said attachment.

9. Attachment applying means as defined in claim 7 including a second resilient pad connected between said supporting means and said attachment, said second pad being placed under compression upon movement of said supporting means to said second position, whereby said second pad under compression applies a force to said attachment to urge said attachment toward the support.

10. Apparatus for applying an attachment to a surface comprising:
   an attachment for engagement with the surface;
   support means for movably supporting said attachment for movement between a first position with said attachment spaced from bearing engagement with the surface and a second position with said attachment in bearing engagement with the surface;

resilient means carried by said support means;

connector means for temporarily securing said resilient means with respect to the surface adjacent said attachment said support means being movable between said first and second positions while said connector means is secured with respect to the surface, and said resilient means being positioned between said support means and the surface; and said resilient means being placed under tension upon movement of said support means to said second position for reacting between said support means and the surface for urging said support means toward said attachment for applying a force to said attachment to urge said attachment in a direction toward the surface.

11. The apparatus of claim 10 wherein said connector means comprises an adhesive layer on said resilient means for securing said resilient means to the surface.

12. The apparatus of claim 10 wherein said support means comprises an over-center type spring plate carrying said attachment and movable with respect to said resilient means for movement from said first position to said second position.

13. The apparatus of claim 12 further including second resilient means connected between said attachment and said spring plate for resiliently urging said attachment toward the surface when said attachment is in said second position.

14. The apparatus of claim 10 wherein said connector means temporarily secures said support means with respect to the surface at a position spaced from and surrounding said attachment.

15. The apparatus of claim 12 wherein said support means comprises a warped spring plate selectively movable between a convex first position and a concave second position.

16. The apparatus of claim 10 including a curable adhesive carried by said attachment for interposition between said attachment and the surface when said attachment is in said second position.

17. The apparatus of claim 10 wherein said connector means comprises a noncurable pressure-sensitive adhesive.

18. Means for applying an attachment to a support, comprising:

an attachment;

means supporting said attachment;

connector means for temporary connection of said supporting means with respect to said support, said supporting means being movable while temporarily connected with respect to said support between a first position with said attachment out of bearing engagement with said support and a second position with said attachment in bearing engagement with said support; and a resilient pad connected between said connector means and said supporting means, said pad being annular in shape and spaced radially outwardly from said attachment, said pad being placed under tension upon movement of said supporting means to said second position, whereby said pad applies a force to said supporting means and said attachment to urge said attachment in a direction toward said support.

19. Attachment applying means as defined in claim 18 including a second resilient pad connected between said supporting means and said attachment, said second pad being placed under compression upon movement of said supporting means to said second position, whereby said second pad under compression applies a force to said attachment to urge said attachment in a direction toward the support.

20. Apparatus for applying an attachment to a surface, comprising:

an attachment for engagement with the surface;

support means for movably supporting said attachment for movement between a first position with said attachment spaced from bearing engagement with the surface and a second position with said attachment in bearing engagement with the surface;

resilient means interposed between said attachment and said support means;

connector means for temporarily securing said support means with respect to the surface adjacent said attachment, said support means being movable between said first and second positions while temporarily secured with respect to the surface; and said resilient means being placed under compression upon movement of said support means to said second position for reacting between said support means and said attachment for applying a force to said attachment to urge said attachment in a direction toward the surface.

21. The apparatus of claim 20 further including second resilient means interposed between the surface and said support means and temporarily connected by said connector means with respect to the surface, said second resilient means being placed under tension upon movement of said support means to said second position for reacting between said support means and the surface for urging said support means toward said attachment to urge said attachment in a direction toward the surface.

22. The apparatus of claim 10 or 20 wherein said resilient means comprises a resilient pad.

* * * * *